United States Patent
Hewitt, Jr.

(10) Patent No.: US 12,376,712 B2
(45) Date of Patent: Aug. 5, 2025

(54) HOOKED TOWEL ROD AND METHOD

(71) Applicant: Melvin S. Hewitt, Jr., Joliet, IL (US)

(72) Inventor: Melvin S. Hewitt, Jr., Joliet, IL (US)

( * ) Notice: Subject to any disclaimer, the term of this patent is extended or adjusted under 35 U.S.C. 154(b) by 0 days.

(21) Appl. No.: 18/624,554

(22) Filed: Apr. 2, 2024

(65) Prior Publication Data

US 2024/0268609 A1 Aug. 15, 2024

Related U.S. Application Data

(62) Division of application No. 16/033,367, filed on Jul. 12, 2018, now Pat. No. 11,980,325.

(60) Provisional application No. 62/533,033, filed on Jul. 15, 2017.

(51) Int. Cl.
*A47K 10/10* (2006.01)
*A47K 10/04* (2006.01)

(52) U.S. Cl.
CPC .............. *A47K 10/10* (2013.01); *A47K 10/04* (2013.01)

(58) Field of Classification Search
CPC ........ A47K 10/10; A47K 10/08; A47K 10/04; A47G 25/746
USPC ................................. 211/88.04, 123
See application file for complete search history.

(56) References Cited

U.S. PATENT DOCUMENTS

| | | | |
|---|---|---|---|
| 158,476 A * | 1/1875 | Dorr | A47G 25/746 211/85.3 |
| 586,080 A * | 7/1897 | Thompson | A47G 25/0692 211/16 |
| 1,072,204 A * | 9/1913 | Boehm | A47K 10/04 248/251 |
| 1,096,282 A | 5/1914 | Boehm | |
| 1,097,496 A | 5/1914 | Woodhead | |
| 1,117,771 A * | 11/1914 | Boehm | A47G 25/0692 248/251 |
| 1,409,056 A | 3/1922 | Michaels | |
| 1,457,166 A | 5/1923 | Hayes | |
| 1,480,065 A | 1/1924 | Hart | |
| 1,510,294 A | 9/1924 | Bertrand | |
| 1,532,320 A | 4/1925 | Knapp | |
| 1,554,375 A | 9/1925 | Schnell | |
| 1,692,059 A | 11/1928 | Starner | |
| 1,697,763 A | 1/1929 | Hall | |
| 1,799,558 A | 4/1931 | Howard | |

(Continued)

FOREIGN PATENT DOCUMENTS

| CH | 128195 A | * 10/1928 |
|---|---|---|
| CH | 351084 A | * 12/1960 |

(Continued)

*Primary Examiner* — Stanton L Krycinski

(57) ABSTRACT

A method for hanging a towel on a towel rod. The method includes folding the towel such that opposing width edges of the towel hangs downwards towards a floor and such that a first towel portion of the towel is turned over to face a second towel portion of the towel, a bent section being defined between the first towel portion and the second towel portion. The method further includes holding a right and a left length edge of the towel and turning the right and the left length edge of the towel upwards away from the floor and positioning the right and the left length edge of the towel over a right and a left side portion of the towel rod. The method enables an intermediate portion of the towel to be suspended on the towel rod, extending across an empty space without any contact with the towel rod.

10 Claims, 4 Drawing Sheets

(56) References Cited

U.S. PATENT DOCUMENTS

| | | | | |
|---|---|---|---|---|
| 1,891,310 A | * | 12/1932 | Hicks | A47G 25/746 |
| | | | | 211/106 |
| 1,909,334 A | | 5/1933 | Brewer | |
| 1,956,340 A | * | 4/1934 | Bernhardt | A47K 10/04 |
| | | | | 248/251 |
| 1,972,282 A | | 9/1934 | Wittstein | |
| 2,024,892 A | * | 12/1935 | Soper | A47K 10/04 |
| | | | | 211/119.009 |
| 2,252,249 A | * | 8/1941 | Brown | A47K 10/04 |
| | | | | 211/123 |
| 2,259,166 A | * | 10/1941 | Kendrick | A47K 10/04 |
| | | | | 211/99 |
| 2,290,468 A | | 7/1942 | Godfrey | |
| 2,447,204 A | | 8/1948 | Piotrowski | |
| 2,512,203 A | | 6/1950 | Harty | |
| 2,612,273 A | | 9/1952 | Smith | |
| 2,622,743 A | | 12/1952 | Ross | |
| 2,639,041 A | | 5/1953 | Davis | |
| 2,790,197 A | | 4/1957 | Ganter | |
| 2,825,469 A | | 3/1958 | Watkins | |
| D259,753 S | * | 7/1981 | Fleischmann | D6/549 |
| 4,372,449 A | * | 2/1983 | Fink | A47K 10/04 |
| | | | | 248/214 |
| 4,465,198 A | | 8/1984 | Martin | |
| 4,828,122 A | | 5/1989 | Day | |
| 5,711,434 A | | 1/1998 | Adams | |
| 6,012,692 A | | 1/2000 | Meck | |
| 6,220,460 B1 | | 4/2001 | Pan | |
| 6,250,597 B1 | * | 6/2001 | Kuo | A47K 10/10 |
| | | | | 248/231.91 |
| 6,371,423 B1 | | 4/2002 | Miller | |
| 6,651,830 B2 | | 11/2003 | Pan | |
| 6,719,156 B2 | | 4/2004 | Ellbogen | |
| 6,796,442 B1 | | 9/2004 | Wu | |
| 6,845,870 B2 | * | 1/2005 | Yang | A47K 10/04 |
| | | | | 211/104 |
| 8,479,931 B1 | | 7/2013 | Richards | |
| 8,671,545 B1 | | 3/2014 | Zimmerman | |
| 9,033,296 B1 | | 5/2015 | Richards | |
| 9,220,340 B2 | | 12/2015 | Kuo | |
| 9,480,206 B2 | | 11/2016 | Hendricks | |
| 9,888,767 B1 | | 2/2018 | Gao | |
| 2009/0188879 A1 | | 7/2009 | Shieh | |
| 2009/0308995 A1 | | 12/2009 | Kuo | |
| 2010/0300994 A1 | | 12/2010 | Turner-Wiltshire | |
| 2012/0024809 A1 | | 2/2012 | Rowan | |
| 2013/0092646 A1 | | 4/2013 | Wang | |
| 2017/0112334 A1 | * | 4/2017 | Holland | A47K 10/12 |

FOREIGN PATENT DOCUMENTS

| | | | | |
|---|---|---|---|---|
| CH | 382399 A | * | 9/1964 | |
| DE | 442569 C | * | 3/1927 | |
| DE | 477788 C | * | 6/1929 | |
| FR | 2623575 A1 | * | 5/1989 | |
| GB | 263690 A | * | 1/1927 | |
| GB | 657177 A | * | 9/1951 | |
| GB | 743595 A | * | 1/1956 | |
| JP | 08257291 A | * | 10/1996 | |
| JP | 09182898 A | * | 7/1997 | |
| KR | 200440055 Y1 | * | 5/2008 | |
| KR | 100958060 B1 | * | 5/2010 | |
| KR | 200461401 Y1 | * | 7/2012 | |

* cited by examiner

FRONT VIEW

TOP VIEW

ISOMETRIC VIEW

FRONT VIEW

FRONT VIEW

HOOKED TOWEL ROD AND METHOD

CROSS REFERENCE TO RELATED APPLICATIONS

This present application is a Divisional application of and claims the benefit of U.S. patent application Ser. No. 16/033,367, entitled "HOOKED TOWEL ROD AND METHOD," filed Jul. 12, 2018, which application claims the benefit of U.S. Provisional Application No. 62/533,033, entitled "HOOKED TOWEL ROD" filed Jul. 15, 2017, which applications are incorporated herein by reference in their entirety.

FIELD OF THE INVENTION

The present invention relates to a household article. More particularly, and in a preferred intended use, the present invention relates to a rack for supporting towels and a towel hanging method for facilitating the drying of towels.

BACKGROUND OF ART

Most people take a shower or bath once every 24 hours. The common practice is to use a dry towel to thoroughly dry the body after bathing. Once a towel is used there is need to dry it thoroughly and store it for the next use. There are a wide variety of towel hanging, organization and storage devise such as towel rods, hooks, racks, baskets, shelves, heated towel drying devices or devices that are comprised of a combination of the afore mentioned devices. The problem with these products is that they either take up too much space in a shared bathroom, do not allow for efficient towel drying, are relatively expensive or waste energy. One of the more common prior art devices used is a variety of basic towel rods. After use a towel is usually folded in half by width and then folded at mid-length over a towel rod however this common method traps moisture and does not allow a towel to dry thoroughly. One solution to this problem is to only fold the towel once in half over a towel rod or shower curtain rod. This method allows the towel to dry faster but does not allow room for a washcloth to be hung and is an inconvenience for anyone else who needs to bath.

Towel racks with multiple hooks and bars help to save space but a towel hung on a hook or folded over a towel rod will not dry thoroughly by the next use. Towel drying racks are another sought after solution but most require a system such as a boiler and radiator system or electrical device already in place. This is not a viable option for most households. Towels that are not dried efficiently and left damp in the bathroom can facilitate microorganism growth some of which may produce a foul odor and may become a health risk.

The present inventor recognized the need for a device that aids in efficiently drying towels, uses less living space and does not require energy use as prior art devices do. The inventor recognized the need for an improved method of hanging a towel in a state that better facilitates water evaporation.

DETAIL DESCRIPTION OF DRAWINGS

Figure 1:
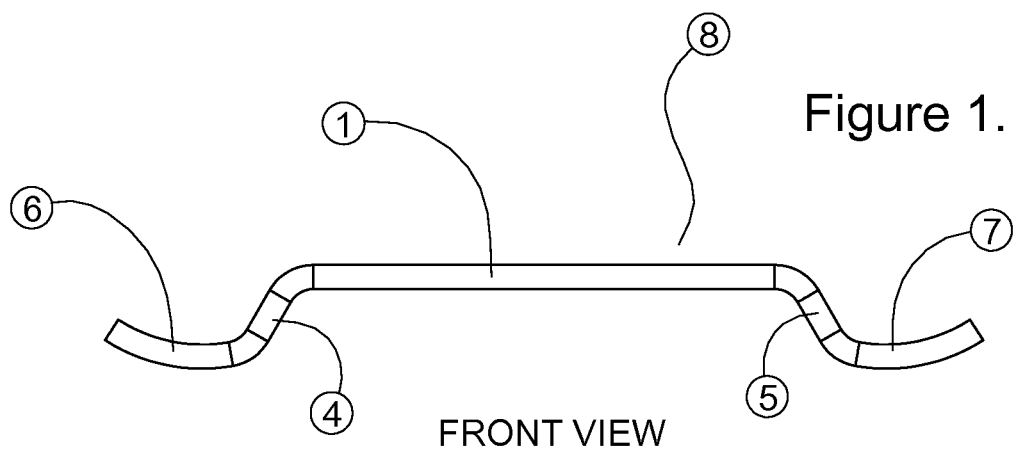
FIG. 1. shows a front view of the present invention.

In the following description the same numeral references refer to similar elements. The embodiments shown in the Figures are preferred, for exemplification of purpose only. In addition, although the preferred embodiments of the present invention as illustrated in the accompanying drawings comprise various components, etc. and although the preferred embodiments of the towel rod device and corresponding parts of the present invention as shown consist of certain geometrical configurations as explained and illustrated herein, not all of these components and geometries are essential to the invention and thus should not be taken in their restrictive sense, i.e. These components and geometries should not be taken as to limit the scope of the present invention. It is to be understood, as also apparent to a person skilled in the art, that other suitable components and cooperation there between, as well as other suitable geometrical configurations may be used for the towel rod device according to the present invention, as will be briefly explained herein and as can be easily inferred here from by a person skilled in the art, without departing from the scope of the invention.

A method for hanging a towel on the towel rod is disclosed. In an aspect, the method includes utilizing a towel rod, wherein the towel rod includes a right side portion and a left side portion with ends directed oppositely to face away from each other. Next, the method includes folding the towel such that the opposing width edges of the towel hangs downwards towards the floor with a first towel portion of the towel turned over to face a second towel portion of the towel with a bent section defined between the first towel portion and a second towel portion. Further, the method includes holding a left length edge and a right length edge of the towel defined across the bent section, turning the right length edge and the left length edge upwards away from the floor with respect to an intermediate portion of the towel, and positioning the left length edge and the right length edge of the towel over the left side portion and the right side portion of the towel rod such that the towel is suspended on the towel rod with the intermediate portion extending across an empty space devoid of any structures extending between the right side portion and the left side portion of the towel rod, without contact with the towel rod. This method enables to hang the towel on the towel rod to facilitate better drying of the towel's surfaces.

In another aspect, the method includes utilizing a towel rod, wherein the towel rod includes an elongated first portion positioned at an elevation to a floor with a second portion and a third portion extending from the opposing ends of the elongated first portion. Further, the towel rod includes a fourth portion and a fifth portion extending from the second portion and third portion of the towel rod respectively. Additionally, the fourth portion and the fifth portion of the towel rod are each curved upwards to form in a direction opposite from the floor. The elongated first portion, the second portion, the third portion, the fourth portion, and the fifth portion, may be integrally and continuously formed from a single cylindrical rod. Next, the method includes folding the towel such that the opposing edges of the towel hangs downwards towards the floor with a first towel section of the towel turned over to face a second towel section of the towel with a bent section defined between the first towel section and a second towel section. Further, the method includes holding a right length edge and a left length edge of the towel defined across the bent section, turning right length edge and a left length edge upwards away from the floor with respect to an intermediate portion of the towel, and positioning the right length edge and the left length edge of the towel over the fourth portion and the fifth portion of the towel rod such that the towel is suspended on the towel rod with the intermediate portion extending across the empty space without contact with the towel rod. This method enables to hang the towel on the towel rod to facilitate better drying of the towel's surfaces.

Figure 9:
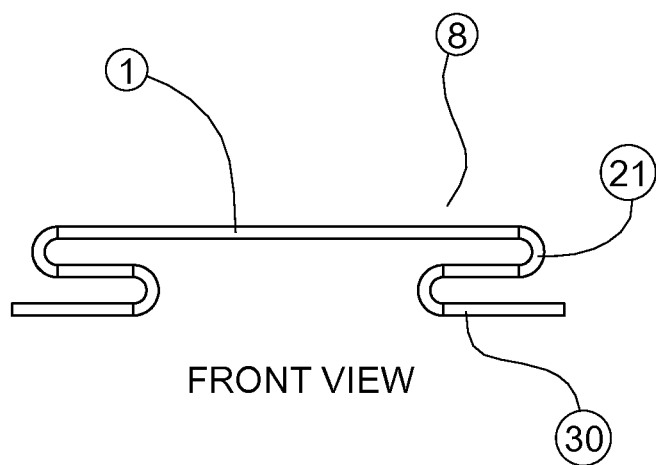
FIG. 9. shows the present invention, towel rod in an alternative configuration.
Figure 10:
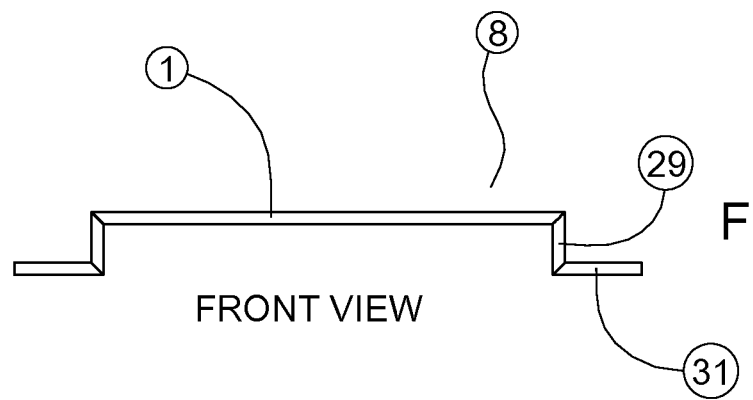
FIG. 10. shows the present invention, towel rod in an alternative configuration.

Referring to the present drawings there is shown in FIG. 1 of the present invention which is a towel rack device 8 constructed of a horizontally orientated bar as the major portion 1 of the first embodiment of FIG. 1 which at present has a circular cross section but may be constructed of any variety of shapes with a cross section such as but not limited to a square, triangle, hexagon, etc. The second portion 4 and third portion 5 of the first embodiment are of no fixed pattern and are attached to or extensions of the first portion 1 of the first embodiment and are located on either end of the first portion 1 of the first embodiment. At present the second portion 4 and third portion 5 of the first embodiment bend downward relative to the first portion 1 of the first embodiment. The second portion 4 and third portion 5 of the first embodiment then bend out from the first portion 1 of the first embodiment and are attached thereon or are extended by a fourth portion 6 and fifth portion 7 of the first embodiment which are support means for a woven piece of fabric such as but not limited to a towel 10 of standard size as is known in the art and of which is present in FIGS. 4 through 7. The second portion 4 and third portion 5 of the first embodiment may be created of a variety of shapes within the scope of facilitating the present towel hanging method. An example of such as is shown in FIG. 9 and FIG. 10. The fourth portion 6 and fifth portion 7 of the first embodiment may be created of a variety of shapes within the scope of facilitating the present towel hanging method. An example of such as is shown in FIG. 9 and FIG. 10.

Figure 8:
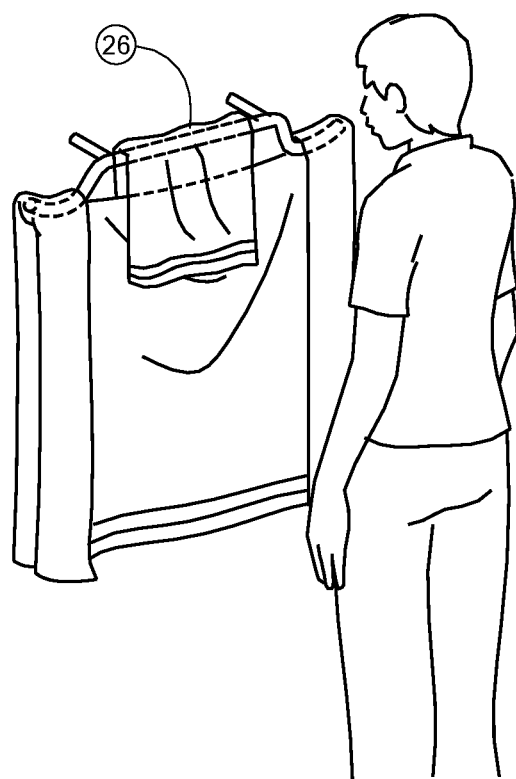
FIG. 8. shows the present invention, towel rod in the second state of use.

The first portion 1 of the first embodiment may be able to hang a smaller piece of woven fabric such as but not limited to a washcloth 26 as known in the art and as shown in FIG. 8.

Figure 2:
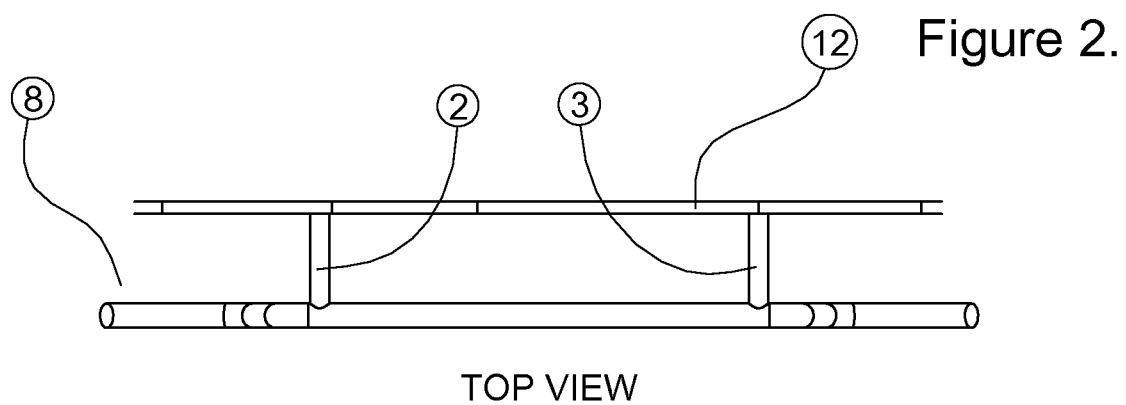
FIG. 2. shows a top view of the present invention of FIG. 1.
Figure 3:
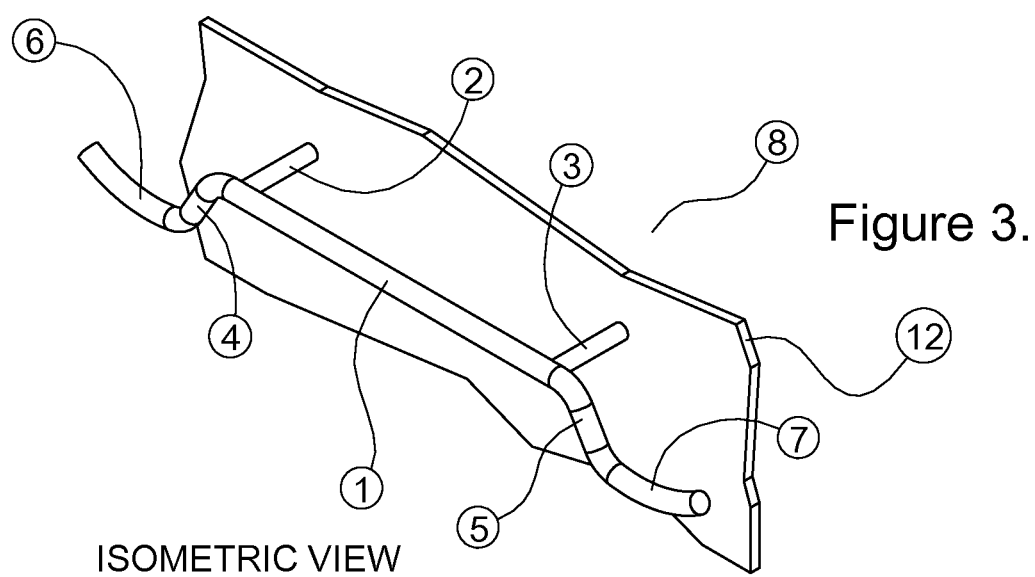
FIG. 3. shows an isometric view of the present invention of FIG. 1, in accordance with all the embodiments of the present invention.

Spacer constructs 2, 3 of no fixed shape or pattern and of shorter length in FIG. 2 relative to the first portion 1 of the first embodiment are attached thereon near either end of the first portion 1 of the first embodiment for the purpose of mounting onto a stationary object such as but not limited to a wall, door, and the like, and provide adequate separation between the hanging towel 10 and wall 12.

Figure 4:
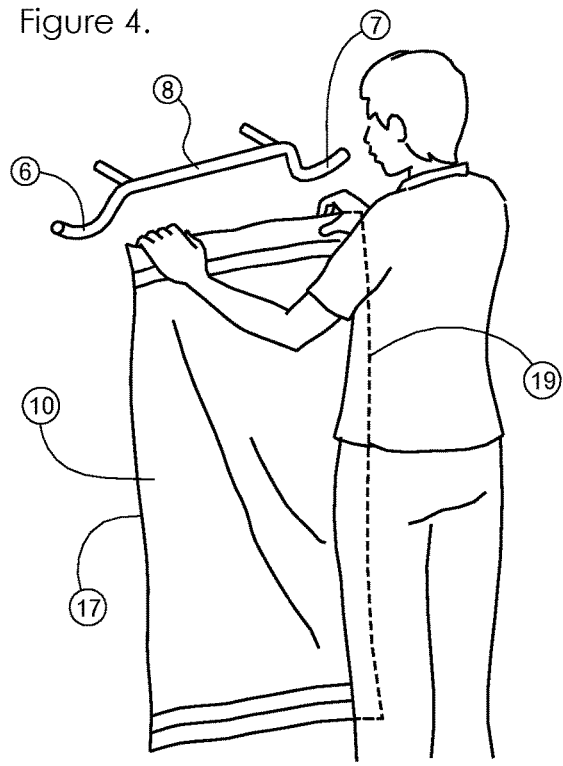
FIG. 4. shows the first step of the towel hanging method.
Figure 5:
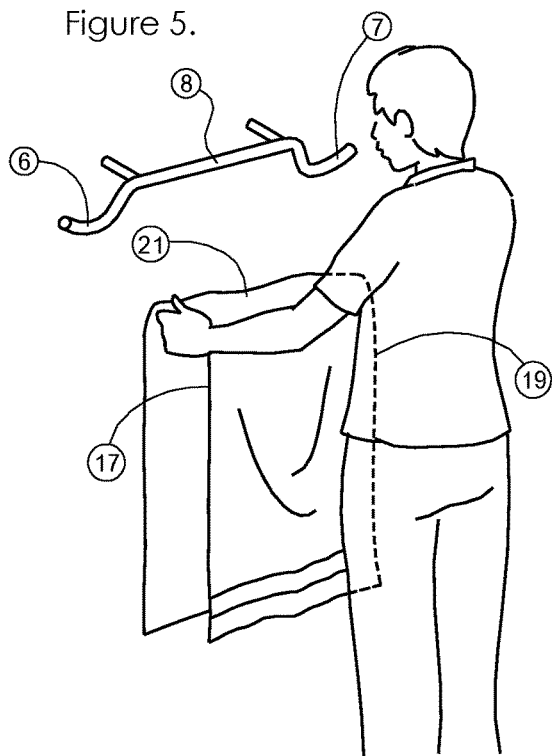
FIG. 5. shows the second step of the towel hanging method.
Figure 6:
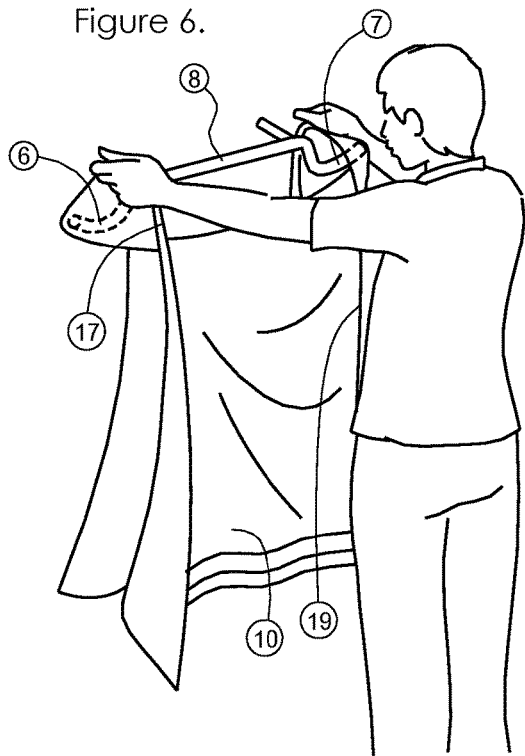
FIG. 6. shows the third step of the towel hanging method.
Figure 7:
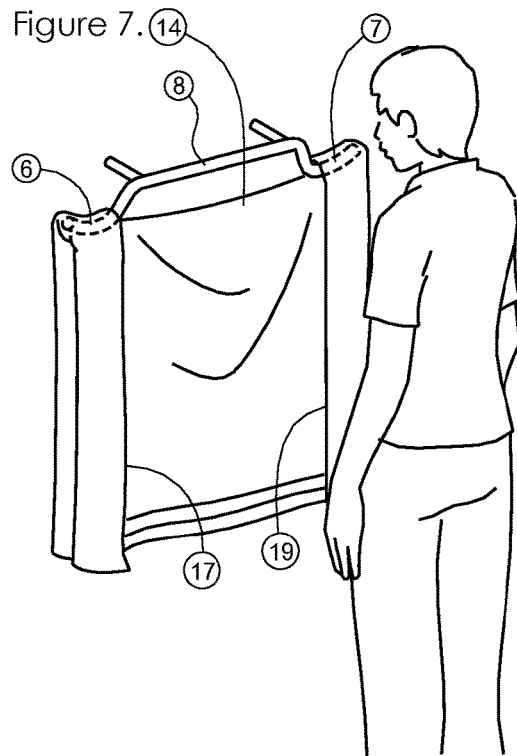
FIG. 7. shows the present invention, towel rod in the first state of use.

FIGS. 4 through 8 show the steps of the present towel hanging method and states of use of the present invention. FIG. 4. shows the first step of the towel hanging method which is to prepare a towel 10 to be folded by holding a towel vertically by length. FIG. 5. shows the second step of the towel hanging method which is to fold a towel 10 approximately in half at middle length 21. FIG. 6. shows the third step of the towel hanging method which is to fold the right length edge 17 and left length edge 19 of a towel 10 over the fourth portion 6 and fifth portion 7 of the first embodiment of the present invention 8 so that a towel 10 is supported thereon by portions 6 and 7 of the first embodiment. The portions of a towel 10 near the respective right length edge 17 and left length edge 19 may be single folded in the case of small towels or double folded in the case of larger towels over the portions 6 and 7 of the first embodiment of the hooked towel rod 8. FIG. 7 shows the present invention 8 in the first state of use with a towel 10 in it's final position supported by the present invention 8. FIG. 8. shows the present invention in it's second state of use with a washcloth 26 supported by the present invention. FIG. 9. shows an alternate configuration of the hooked embodiment 21 which supports the support means 30 for a towel. FIG. 10. shows an alternate configuration of the hooked embodiment 29 which supports the support means 31 for a towel.

INDUSTRIAL APPLICABILITY

The present invention could be created in a variety of colors to increase its aesthetic appeal to consumers and manufactured using a variety of materials such as but not limited to metals such but not limited to steel, aluminum or other metal alloys. Or other materials such as but not limited to wood, plastics or a combination of materials such as rigid composite materials.

Any metal components of the present invention 8 can be manufactured with the use of a variety of metal forming techniques including but not limited to metal casting techniques, metal extrusions techniques, metal welding techniques, metal bending techniques and metal milling techniques, etc.

Any plastic components of the present invention 8 can be manufactured with the use of a variety of plastic forming techniques such as but not limited to injection molding, 3D printing and extrusion molding techniques, etc. Any wood components of the present invention 8 can be manufactured with the use of a variety of wood forming techniques such as but not limited to wood milling, wood forming, wood carving techniques and the like.

The present invention may be created by forming a rod of afore mention rigid metal material and using known bending techniques bend a long cylindrical rod on each end downward and then out from the major body 1 to form hooks or strait lengths 6 and 7 on either end of the major body 1. The total length of the present invention including portions 1, 4, 5, 6, and 7, of the first embodiment must be sufficient to secure a towel 10 from falling under its own weight using the present towel hanging method or when disturbed by forces such but not limited to one stroking a towel 10 to make folds neat or adjusting a towel 10 into the final present towel hanging position. The wall spacers and mounts 2, 3 may be created by forming the afore mentioned materials into a variety of shapes such as tubes, solid cylinders or rods of any shaped cross section or other form which provides support for the hooked towel rod 8 to be attached on to a wall 12 or other stationary object such as a door or the like. At present the spacer mounts 2, 3 may be made of tubes which can be fastened onto the towel rod by welds, with screws and threaded holes or other means known in the art. The spacer mounts 2, 3 may be attached to a wall 12 or other stationary object or fastening device by weld means, with screws and threaded holes or other means known in the art.

The above description is intended to enable the person skilled in the art to practice the invention. It is not intended to detail all of the possible carnations and modifications that become apparent to the skilled worker upon reading this description. It is interceded however that all such modifications and variations be included within the scope of the invention and that is defined by the following claims.

I claim:

1. A method for hanging a towel for drying the towel, the method comprising:
    using a towel rod, the towel rod including:
        an elongated first portion positionable at an elevation to the floor and defining a first end and a second end, the second end being opposed to the first end;
        a second portion and a third portion, the second portion extending from the first end and the third portion extending from the second end, each of the second portion and the third portion being oriented at an angle to the elongated first portion, an empty space devoid of any structures is in part defined therebetween by the elongated first portion, the second portion, and the third portion;
        a fourth portion and a fifth portion, the fourth portion extending from the second portion and the fifth portion extending from the third portion, wherein the fourth portion and the fifth portion are directed oppositely to face away from each other and are each curved upwards to form in a direction opposite from the floor, wherein the elongated first portion, the second portion, the third portion, the fourth portion, and the fifth portion, are integrally and continuously formed from a single cylindrical rod;
    folding the towel such that opposing edges of the towel hangs downwards towards the floor and such that a first towel section of the towel is turned over to face a second towel section of the towel, a bent section being defined between the first towel section and the second towel section;
    holding a right length edge and a left length edge of the towel defined across the bent section;
    turning the right length edge and the left length edge upwards away from the floor with respect to an intermediate portion of the towel; and
    positioning portions of the right length edge and the left length edge over the fourth portion and the fifth portion of the towel rod such that the towel is suspended on the towel rod with the intermediate portion extending across the empty space without contact with the towel rod.

2. The method of claim 1, wherein the towel is suspended in a hyperbolic paraboloid state on the towel rod.

3. The method of claim 2, wherein positioning portions of the right length edge and the left length edge over the fourth portion and the fifth portion of the towel rod enables the towel to be suspended in a hyperbolic paraboloid state on the towel rod.

4. The method of claim 2, wherein the towel is made to rest with one side of the towel being bent over downwards towards the floor along the width of the towel to face itself, and other side of the towel being bent over upwards away from the floor near the right length edge and the left length edge of the towel, along the length of the towel to face itself.

5. The method of claim 1, further comprising hanging a woven fabric on the elongated first portion of the towel rod such that segments of the woven fabric are turned towards each other about the elongated first portion and the segments of the woven fabric are, at least in part, disposed outwardly of the first towel section of the towel and the second towel section of the towel,
    wherein the towel and the woven fabric are stored on the towel rod significantly apart from one another to allow air flow between corresponding surfaces of the towel and the woven fabric.

6. The method of claim 1, wherein each of the elongated first portion, the fourth portion, and the fifth portion, are disposed to extend along a common plane.

7. The method of claim 1, further including one or more spacer mounts to attach onto a stationary object and provide a gap between the stationary object and the elongated first portion.

8. The method of claim 1, wherein a length of the elongated first portion is relatively longer compared to other portions of the towel rod; and wherein a distance between the elongated first portion and the fourth portion is equal to a distance between the elongated first portion and the fifth portion.

9. The method of claim 1, wherein
    a length of the elongated first portion is at least 6 inches and no more than 26 inches;
    a length of the fourth portion is at least 2 inches and no more than 10 inches;
    a length of the fourth portion is at least ½ inches and no more than 6 inches lower than the elongated first portion; and
    a length of the fifth portion is at least 2 inches and no more than 10 inches.

10. The method of claim 1, wherein the fourth portion and the fifth portion are each curved upwards in a direction outwardly of the towel rod.

* * * * *